US012688272B2

(12) United States Patent
Gibis et al.

(10) Patent No.: US 12,688,272 B2
(45) Date of Patent: Jul. 21, 2026

(54) AUTHORIZING AN APPLICATION ON A SECURITY ELEMENT

(71) Applicant: GIESECKE+DEVRIENT EPAYMENTS GMBH, Munich (DE)

(72) Inventors: Oliver Gibis, Munich (DE); Werner Ness, Unterschleissheim (DE); Alexander Summerer, Poing (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 51 days.

(21) Appl. No.: 18/701,995

(22) PCT Filed: Oct. 18, 2022

(86) PCT No.: PCT/EP2022/000096
§ 371 (c)(1),
(2) Date: Apr. 17, 2024

(87) PCT Pub. No.: WO2023/072422
PCT Pub. Date: May 4, 2023

(65) Prior Publication Data
US 2025/0238490 A1    Jul. 24, 2025

(30) Foreign Application Priority Data

Oct. 27, 2021    (DE) ..................... 10 2021 005 351.6

(51) Int. Cl.
*G06F 21/32*        (2013.01)
*G06F 21/62*        (2013.01)
(52) U.S. Cl.
CPC ............ *G06F 21/32* (2013.01); *G06F 21/629* (2013.01)

(58) Field of Classification Search
CPC ......... G06F 21/32; G06F 21/629; G06F 21/31
See application file for complete search history.

(56) References Cited

U.S. PATENT DOCUMENTS

| | | | | |
|---|---|---|---|---|
| 10,693,872 B1 * | 6/2020 | Larson | .................. | H04L 9/3231 |
| 2004/0019570 A1 * | 1/2004 | Bolle | ................... | G06V 40/168 |
| | | | | 705/64 |
| 2008/0126811 A1 * | 5/2008 | Chang | ................... | H04L 9/3231 |
| | | | | 713/186 |

(Continued)

FOREIGN PATENT DOCUMENTS

| | | | | |
|---|---|---|---|---|
| EP | 1189128 A2 | 3/2002 | | |
| EP | 3941014 A1 * | 1/2022 | ............. | H04L 67/04 |
| WO | WO-2021122644 A1 * | 6/2021 | ......... | H04L 63/0861 |

OTHER PUBLICATIONS

German Search Report from corresponding DE Application No. 102021005351.6, Jul. 7, 2022.

(Continued)

*Primary Examiner* — Javier O Guzman
(74) *Attorney, Agent, or Firm* — Workman Nydegger

(57)        ABSTRACT

A method for authorizing an application installed on a security element includes the steps of transmitting authorization information from a user verification element to the security element, comparing the authorization information with at least one requirement from a list on the security element; and selecting the application on the security element and/or performing a transaction by means of the application, provided that the authorization information meets the requirements from the list.

18 Claims, 4 Drawing Sheets

(56)                    References Cited

U.S. PATENT DOCUMENTS

| | | | |
|---|---|---|---|
| 2009/0307142 A1 | 12/2009 | Mardikar | |
| 2011/0002461 A1* | 1/2011 | Erhart | G06F 21/73 |
| | | | 340/5.83 |
| 2012/0192277 A1* | 7/2012 | Jakobsson | H04L 63/145 |
| | | | 726/22 |
| 2013/0065564 A1* | 3/2013 | Conner | G06K 19/0718 |
| | | | 340/5.82 |
| 2015/0256537 A1 | 9/2015 | Chew et al. | |
| 2017/0346851 A1* | 11/2017 | Drake | H04L 9/0838 |
| 2018/0144342 A1* | 5/2018 | Borandi | G06Q 20/00 |
| 2018/0191695 A1* | 7/2018 | Lindemann | H04L 63/0853 |
| 2018/0232506 A1* | 8/2018 | Kumar | G06F 21/62 |
| 2019/0147477 A1* | 5/2019 | Nazarowski | G06Q 30/0226 |
| | | | 705/14.27 |
| 2019/0295077 A1* | 9/2019 | Mardikar | G06Q 20/401 |
| 2020/0021582 A1* | 1/2020 | Brown | G06F 21/6254 |
| 2020/0026834 A1* | 1/2020 | Vimadalal | H04L 9/0825 |
| 2020/0162450 A1* | 5/2020 | Yarabolu | H04L 63/0807 |
| 2020/0211002 A1* | 7/2020 | Steinberg | G06Q 20/385 |
| 2020/0410500 A1* | 12/2020 | Dorogusker | G06Q 20/202 |
| 2022/0012718 A1* | 1/2022 | Wilson | G06Q 20/3829 |

OTHER PUBLICATIONS

International Search Report from corresponding PCT Application
No. PCT/EP2022/000096, Feb. 6, 2023.

* cited by examiner

AUTHORIZING AN APPLICATION ON A SECURITY ELEMENT

BACKGROUND

The present invention relates to a method for authorizing an application installed on a security element, and a corresponding device having a security element and a user verification element.

Mobile devices are known that can be used for digital transactions, e.g. for digital payment or the like. Devices of this type can be designed, for example, as watches or key fobs, but also as telecommunication terminal devices, such as e.g. cell phones or the like. It is often advantageous to equip these devices with a facility for user verification, for example by means of a biometric check, in order to secure transactions.

However, the applications which are necessary for a transaction and which are frequently installed on and executed by the security elements concerned cannot be modified by the manufacturer of the devices, e.g. because certification requirements or other security requirements do not allow this.

In other cases, the applications are supplied by third-party providers as binary code, and the source code is not available at all to the manufacturer of said devices. In order to secure transactions, the third-party provider must therefore, for example, be tasked with a corresponding modification, as a result of which applications have to be additionally certified or recertified, thus incurring considerable cost and taking a substantial amount of time.

SUMMARY

The object of the present invention is therefore to propose a solution which overcomes the aforementioned and further disadvantages of the prior art.

The method according to the invention relates to an authorization of an application installed on a security element and comprises a plurality steps. According to a first step, authorization information is transmitted from a user verification element to the security element. In a second step, the authorization information is compared with at least one requirement from a list on the security element. According to at least one further step, the application concerned on the security element is selected for execution and/or a transaction is performed by means of the application, provided that the authorization information meets the requirements from the list.

The invention defined in this way allows flexible control in determining the transaction that is executed or is allowed to be executed and the conditions under which this takes place. For security elements with applications already existing in the field, the invention enables said security elements to be provided with access protection and transaction protection without modifying their source code or binary code and without performing a re-installation.

The device according to the invention is correspondingly equipped and configured to check the authorization according to the invention of the application installed on the security element. To do this, the device according to the invention comprises a user verification element and a security element on which the application is installed. The user verification element is configured to transmit authorization information to the security element, and the security element is configured in turn to perform the authorization of the application by comparing the authorization information received from the user verification element with at least one requirement from a list and to select the application and/or to perform a transaction by means of the application, provided that the authorization information meets the at least one requirement from the list. In particular, the device according to the invention is suitably equipped and configured to carry out the method according to the invention in all disclosed embodiments and design variants.

The notion of comparing the authorization information with a requirement from the list is to be understood according to the present invention to mean carrying out a check to determine whether either the authorization information is recorded in the list or whether entries in the list identify, address or designate the authorization information directly or indirectly in some other way. In particular, the requirements with which the authorization information is to be compared can represent or comprise conditions which the authorization information must satisfy so that the application is authorized, is to be authorized or can be authorized.

The method according to the invention preferably comprises the step of providing said device with a security element and a user verification element. Here, the user verification element is preferably an element of the device into which it is structurally integrated together with the security element.

However, the method can also relate to at least one further user verification element which is implemented separately from the device and is connected to the device via suitable, for example contactless, data communication channels. With the method according to the invention, the security element can receive further or additional authorization information from the at least one further user verification element via a data communication channel of this type, said authorization information similarly being used to check the authorization of the application.

The list is preferably provided as a blacklist. This blacklist preferably comprises requirements which authorization information must meet during the comparison so that the application concerned on the security element is selected and a transaction can be performed by means of the application. In particular, the blacklist comprises exclusion requirements so that the application concerned is selected and/or the transaction is performed by means of the application only if the comparison indicates that the authorization information does not match any of the exclusion requirements recorded in the blacklist.

In particular, the list is provided as a protection trigger list. This protection trigger list preferably comprises requirements, in particular trigger criteria, which specify the conditions under which certain application commands can be executed by the security element, such as, for example, a SELECT command or a GPO command. The execution, for example, of a specific application command, such as a SELECT command, is allowed only if the authorization information according to the invention meets at least one requirement from the protection trigger list.

A requirement from the list can be, for example, that the authorization information relates to or comprises a specific security-related status, e.g. a user verification status. A user verification status within the meaning of the present invention is a security status or privileges or rights linked to a user of the device according to the invention or of the security element or to the identity of said user in connection with the security element or the applications.

The list then specifies security requirements that a user must meet, or privileges or rights which a user must corroborate through the authorization information so that an application can be selected or a transaction can be performed. If a requirement demands a positive user verification status for selecting a specific application, the authorization information concerned must be linked to, comprise or otherwise relate to a positive user verification status so that the desired application can be selected at the instigation of the user. The selection of the application by the security element is otherwise refused.

In connection with the comparison of the authorization information according to the invention, a check is preferably additionally carried out to determine whether the application to be selected is contained in or is otherwise identified by an AID list. Each application installed on the security element preferably has a unique application identifier, the AID. The AID list preferably comprises the AIDs of all applications to which particular restrictions apply i.e., for example, protection against selection or execution of specific transactions. Whereas the AID therefore holds details of the applications which are protected in principle, a blacklist or other type of list according to the invention relates, for example, to the specific requirements, for example the presence of a specific user verification status or the like. If, for example, an application is to be selected or a transaction is to be performed with the application, the security element establishes by means of the AID list whether execution protection is present and therefore a blacklist or other type of list according to the invention which specifies the applicable requirements is to be additionally consulted.

Default lists, such as a default blacklist, can be provided within the operating system of the security element along with individual, e.g. application-specific or customer-specific lists. This default blacklist preferably comprises those commands for which specific requirements must be met, and also the specific requirements for this command. The default blacklist can relate, for example, only to the SELECT command which can be executed only if a specific user verification status is present. In this case, an application recorded in the AID list can be selected only if the authorization information concerned relates to this user verification status. If no AID list is present, the requirements specified by the default blacklist apply to all applications installed on the security element. The absence of an AID list is therefore preferably equivalent to an AID list which specifies all installed applications.

A broker application which carries out the steps of comparing the authorization information and selecting applications and/or which initiates the performance of transactions is preferably installed on the security element. For this purpose, the broker application stores the authorization information at least partially in a suitable memory in order to then compare it with the requirements from the list and, if necessary, to use it for later selections of applications or executions of transactions. An established, security-related user identification status, for example, can be used for a specific time duration before it needs to be checked once more.

The user verification status is preferably generated by means of a sensor, in particular by means of a biometric sensor, which generates biometric data as a basis for determining the user verification status. A fingerprint sensor is preferably used for this purpose. Alternatively or additionally, other or further sensors can be used which collect additional biometric data. The user verification status can thereby be simply determined, since the user does not need to possess particular equipment or demonstrate particular skills.

The user verification element is connected to the security element via a preferably cryptographically secured or encrypted data communication link, and carries out the user verification by means of sensor data from a suitable sensor, such as a fingerprint sensor. The user verification status determined in this way is transmitted by the broker application to the security element for comparison with the requirements from the list.

The operating system of the security element accesses the list(s) of the broker application, such as an AID list and/or a blacklist or a protection trigger list. These lists are provided for this purpose in a designated storage segment of the security element. The operating system applies the requirements and conditions from the lists if a command is received. The operating system allows the selection of the application and/or the execution of the transaction if the command meets the corresponding requirements. The security element then preferably resets the user verification status so that no further selection and/or transaction execution is possible without a further check.

The sensor preferably comprises a sensor controller, or a sensor controller of the user verification element is assigned to the sensor. The sensor controller is preferably configured to determine whether a predefined, for example positive, user verification status results from the collected sensor data in order to forward the user verification status to a verification controller which interacts with the security element and, in particular, with the broker application.

According to one design variant, the sensor controller, preferably designed as a fingerprint controller, can determine, independently from the other components, whether a user can be verified by the sensor data relating to him. A sensor controller specialized in this way can, particularly in the case of a biometric sensor, ease the load on the verification controller, resulting in a lower energy requirement and longer battery life.

The broker application of the security element, the verification controller and/or the sensor controller can preferably be pre-personalized by means of suitable personalization data which preferably comprise a cryptographic key set for securing the data communication. This key set is stored in the aforementioned components during the pre-personalization. Alternatively or additionally, one key set can be used for communication between the sensor controller and the verification controller, and a further key set can be used for communication between the verification controller and the broker application.

The information, such as the authorization information, exchanged between the verification controller, the broker application of the security element and the sensor controller, is preferably transmitted in encrypted form and/or is at least partially secured with message authentication codes. Manipulations, for example of the user verification status, are thereby prevented.

The user verification status is preferably transmitted from the verification controller to the broker application according to a security protocol, e.g. according to a challenge-response method. Manipulations of the user verification status are thereby prevented, for example through logical attacks by malware in the verification controller, or physical attacks on cable connections between the components. These measures enable secure communication via unsecured components of the device according to the invention.

The broker application preferably has a list of commands as a result of which the user verification status is reset. The broker application has access to the list of these commands for each application which requires a predefined user verification status.

The security element normally performs transactions in a contactless manner, e.g. by means of an NFC or Bluetooth module with an antenna, by means of a suitable transceiver device on the security element or verification controller.

Authentication transactions, payment transactions and/or access transactions are preferably authorized according to the invention. A previously verified user, for example, is authenticated by means of an authentication transaction so that the user can, for example, perform a payment transaction and/or can obtain access to a system or object.

According to some embodiments, the device according to the invention is designed, in particular, as a key fob with an integrated fingerprint sensor.

The verification controller preferably detects whether the user intends to perform a user verification. If so, the verification controller requests a challenge from the broker application, e.g. a random number, which is preferably protected with a message authentication code, for example by means of an HMAC code.

The sensor controller then checks the integrity of the challenge by means of the message authentication code and, if integrity is present, carries out a user verification and determines a user verification status. The sensor controller then transmits the encrypted and secured user verification status to the verification controller which forwards said user verification status to the broker application which decrypts and stores the user verification status if the associated message authentication code is identified as correct. The operating system of the security element can access the user verification status stored in this way and, if the user verification status is positive, allows the selection of the application and/or the performance by the application of the transaction concerned.

BRIEF DESCRIPTION OF THE DRAWINGS

Further features and advantages of the invention are set out in the following description of exemplary embodiments according to the invention and further design alternatives in connection with the drawings, in which.

DETAILED DESCRIPTION OF VARIOUS EMBODIMENTS

Figure 1:
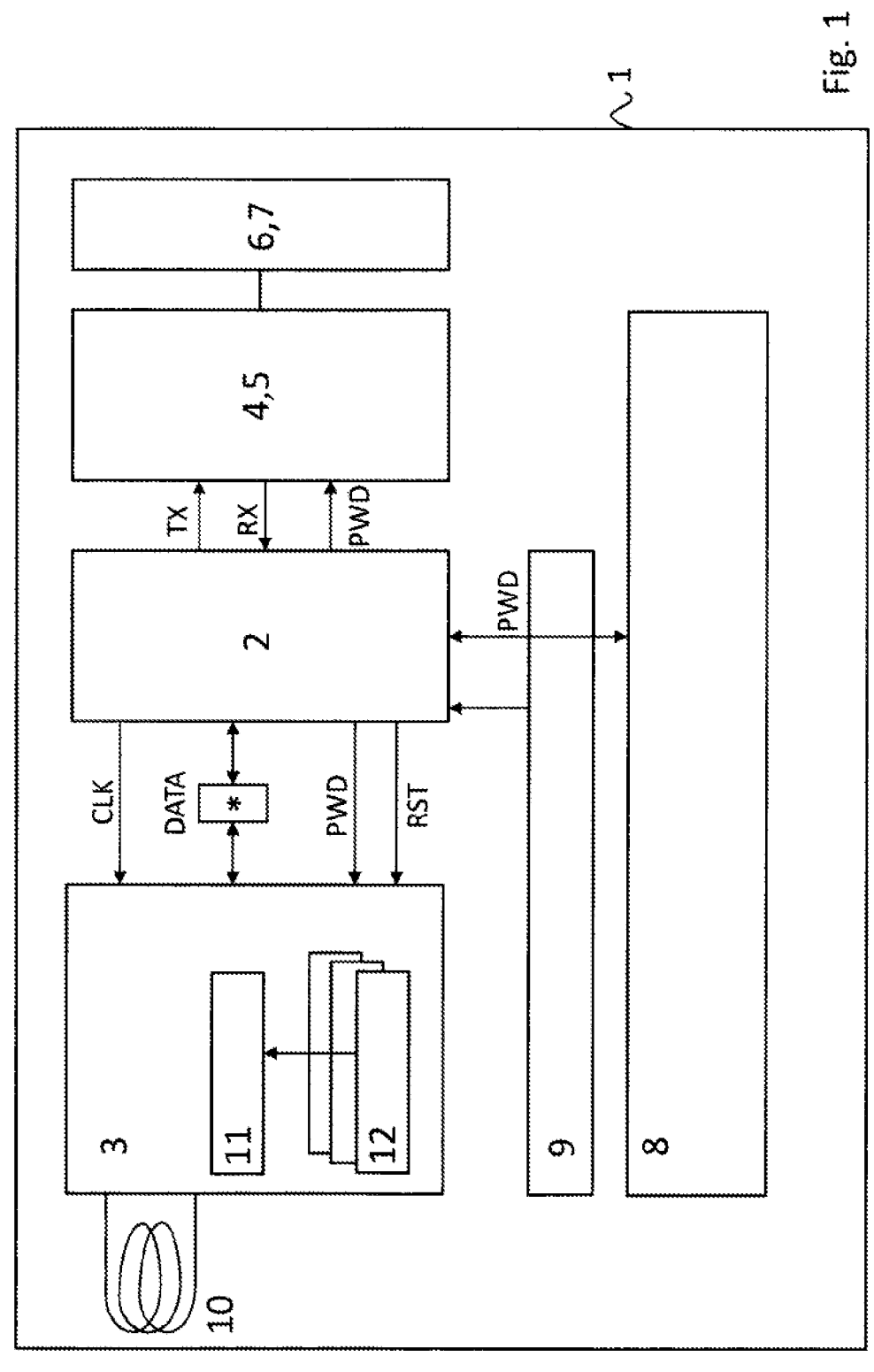
FIG. 1 shows a first embodiment of the device according to the invention.

FIG. 1 shows a device 1 having a verification controller 2 which can be designed as a BLE controller, for example as a Bluetooth Low Energy Controller DIALOG BLE 5.0 DA14683 (WL-CSP53). The device 1 has a security element 3, e.g. a chip card, smart card, eSE, eUICC card or the like, e.g. an Infineon Chip SLE78 with a G+D Sm@rt Café operating system. The device 1 further comprises a sensor controller 4, in particular a fingerprint controller 5, e.g. a Nuvoton NuMicro M480, and a sensor 6, e.g. a fingerprint sensor 7.

According to the embodiment shown in FIG. 1, the BLE verification controller 2 is the main processor and routes all data communication via the BLE channel to the fingerprint controller 5 (TX/RX) and then on to the security element 3. In this context, FIG. 1 shows a data connection DATA and lines RST and CLK between the verification controller 2 and the security element 3 or the sensor controller 4, and also data connections TX ("transmit") and RX ("receive").

The verification controller 2 is supplied with power by a battery 8, e.g. a lithium-ion battery. The verification controller 2 supplies the further components of the device 1, in particular the security element 3 and the sensor controller 4, with power (PWD). A power switch circuit 9 is further connected to the verification controller 2. Applications 12 (e.g. JavaCard applets and/or qVSDC) which communicate either via the verification controller 2 in a contact-based manner or contactlessly via the collected antenna 10 are installed on the security element 3.

The fingerprint sensor 7 transmits biometric data to the fingerprint controller 5 which establishes whether the user concerned can be verified by means of the data. The corresponding user verification status is then transmitted in encrypted form to the verification controller 2 and on from there as authorization information to the broker application 11 on the security element 3. Manipulations, for example through logical attacks by malware in the verification controller or through physical attacks, e.g. bit manipulations at weak points, such as the cable connections between the fingerprint controller 5 and the verification controller 2 and the security element 3, are largely excluded by means of the encryption.

In particular, the device provides a challenge-response security protocol (Key Fob Fingerprint Security Protocol) in order to secure the transmission of the user verification status via unsecured system components, such as the BLE controller or the cable connections of the device 1

In the security element 3, the device 1 has a broker application 11 which receives and stores the user verification status according to the security protocol as authorization information. As soon as an application 12 is selected or a transaction is performed therewith, the operating system 14 of the security element 3 checks the verification status and allows the selection or transaction only if a positive user verification status is present. The broker application 11, referred to as the broker applet, has access to an AID list which designates the applications 12 which are protected by a user verification, and comprises rules which define, for example, the command from which a new selection is not permissible. Once a transaction is completed, the security element 3 resets the user verification status so that a further transaction, e.g. a selection of the application, is not possible without further user verification.

In particular, the broker application 11 enables the definition of the following lists:

an AID list of all applications 12 in the security element 3 which are intended to be protected with a user verification;

a blacklist, in particular a protection trigger list, which specifies the requirements that must be met in the case of a command. A positive user verification status, for example, can be required for a specific command; and a command list for each protected application 12, during the execution of which the user verification status is reset or a further selection is prevented. If this list does not exist or comprises no commands, the user verification status is reset immediately after the selection of the application 12 that is to be protected and a further selection is thereby prevented. The command list enables the targeted definition of the end of a transaction. If, for example, a transaction requires two selections, the command list can record a command with which the transaction is terminated.

The operating system 14 of the security element 3 evaluates rules of the broker application 11, said rules being present, for example, in the form of lists, and applies the rules in such a way that a selection, e.g. a JavaCard applet selection, is permitted or refused, for example due to a payment deadline.

The broker application 11, the fingerprint controller 5 and the verification controller 2 are pre-personalized during the manufacture of the device 1 within a secure environment with the EncKeyID and MacKeyID key set for the Key Fob Fingerprint Security Protocol.

Figure 2:
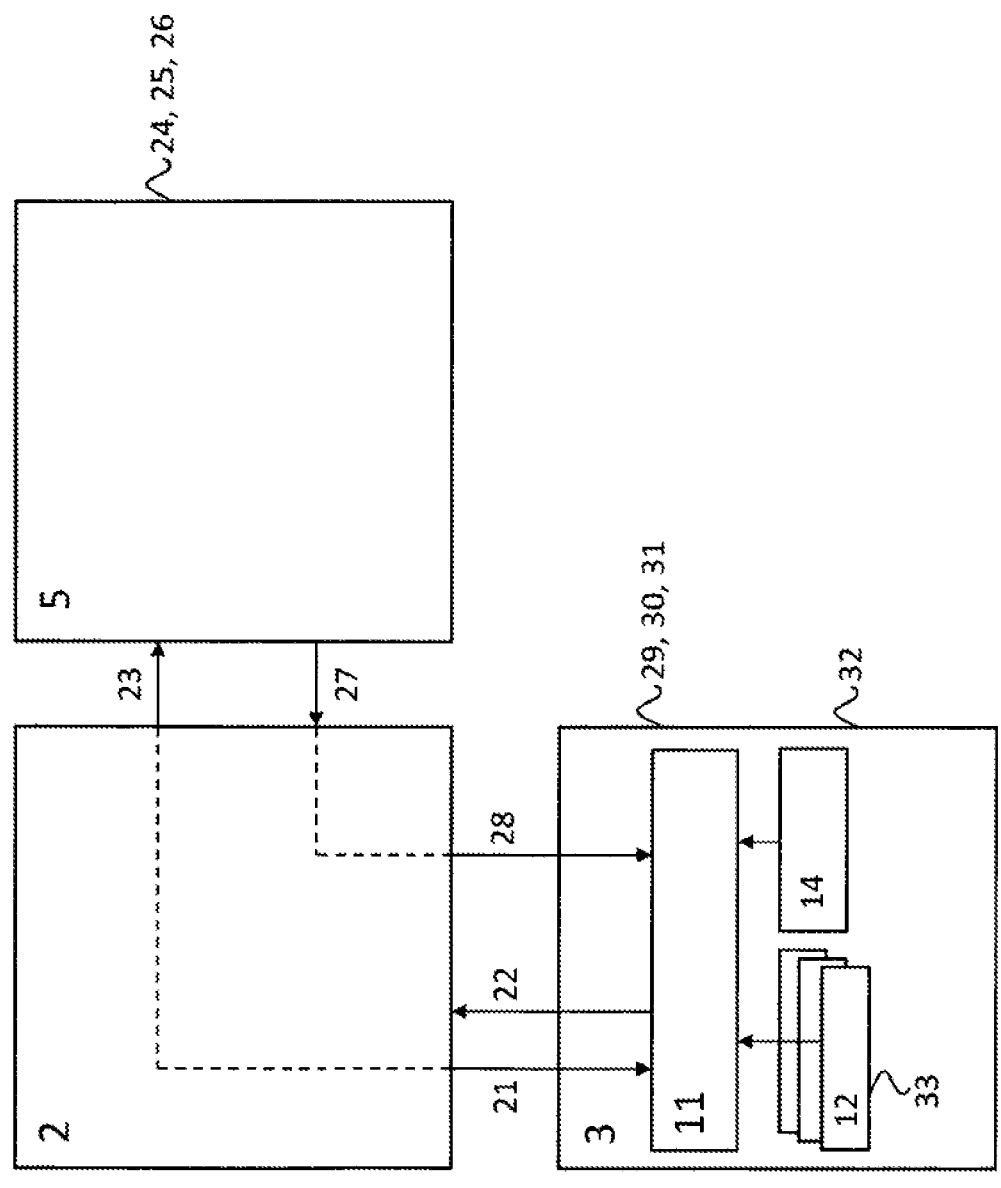
FIG. 2 shows a second embodiment of the device according to the invention.

FIG. 2 illustrates the sequence of a user verification in a plurality of steps:

Step 21: as soon as the verification controller 2 (e.g. the BLE controller) establishes that the user intends to perform a user verification with a fingerprint, the verification controller 2 requests a challenge (e.g. a random number) from the broker application 11 in the security element with the GET_CHALLENGE command.

Step 22: the broker application 11 transmits the challenge, which is protected with the HMAC message authentication code, back to the verification controller.

Step 23: the verification controller 2 executes the MATCH command with the HMAC-secured challenge as an input parameter in order to check the fingerprint, and references the EncKeyID and MacKeyID keys as additional input parameters.

Step 24: the fingerprint controller 5 checks the integrity of the challenge by means of the HMAC signature.

Step 25: the fingerprint controller 5 performs the user verification by means of the fingerprint if the HMAC signature is correct. Otherwise, an error message is communicated to the verification controller 2.

Step 26: the fingerprint controller 5 encrypts the user verification status (OK Match, No Match) and secures it by means of a message authentication code (HMAC) using the EncKey and MacKey keys.

Step 27: the fingerprint controller 5 transmits the user verification status, encrypted and secured with HMAC, back to the verification controller 2.

Step 28: the verification controller 2 forwards the user verification status as authorization information to the broker application 11 on the security element 3.

Step 29: the broker application 11 on the security element 3 checks the HMAC signature of the received user verification status.

Step 30: if the HMAC signature is valid, the user verification status is decrypted by the broker application 11.

Step 31: the decrypted user verification status is stored in the broker application 11.

Step 32: the operating system 14 of the security element 3 requests the user verification status from the broker application 11 together with the defined AIDs and rules and checks the latter.

Step 33: if the user verification was successful and the application 12 has one of the defined AIDs, the operating system 14 allows the selection of the application 12 or the transaction with the application 12.

In the user verification according to FIG. 2, the user verification status is stored in the security element 3. Alternatively, the user verification status can be stored in the verification controller 2, e.g. in the BLE controller. To do this, the verification controller 2 generates a challenge and a corresponding message authentication code, e.g. an HMAC code, executes a MATCH command with the HMAC-secured challenge as an input parameter, and references the cryptographic EncKeyID and MacKeyID keys as additional input parameters.

The fingerprint controller 5 checks the integrity of the challenge by means of the HMAC signature and carries out the user verification by means of the fingerprint if the HMAC signature is correct. Otherwise, an error message is transmitted to the verification controller 2. The fingerprint controller 5 then encrypts the user verification status (OK Match, No Match), secures it by means of a message authentication code (HMAC), and transmits the user verification status, encrypted and secured with HMAC, back to the verification controller 2. The verification controller 2 then checks the message authentication code of the received user verification status and decrypts the user verification status if the HMAC signature is valid. The decrypted user verification status is finally stored in the verification controller 2.

The MATCH command can, in particular, produce the following results:

OK Ready: command received; wait for fingerprint on the sensor;

OK FP: finger detected on the sensor;

OK Match: the selected template matches the finger on the sensor and the matching ID value is returned;

NO Match: the selected template does not match the finger on the sensor.

The sensor controller 4, the fingerprint controller 5, the verification controller 2 and the broker application 11 require pre-stored keys for the encryption and message authentication codes so that a user verification command can be executed. The storage of these keys in said components takes place during the manufacture of the device 1 and is permanently set by means of a KEY_LOCK command.

For a user verification based on the verification controller 2, the keys are stored in the verification controller 2 itself and are overwrite-protected by the latter. For the user verification based on the security element, the EncKeyID_1 [16-byte] and MacKeyID_1 [32-byte] keys are stored in the security element 3 and in the sensor controller 4. For the user verification based on the verification controller 2, the EncKeyID_2 and MacKeyID_2 keys are stored in the verification controller 2 and in the sensor controller 4. These keys can no longer be modified after the execution of the KEY_LOCK command.

Figure 3:
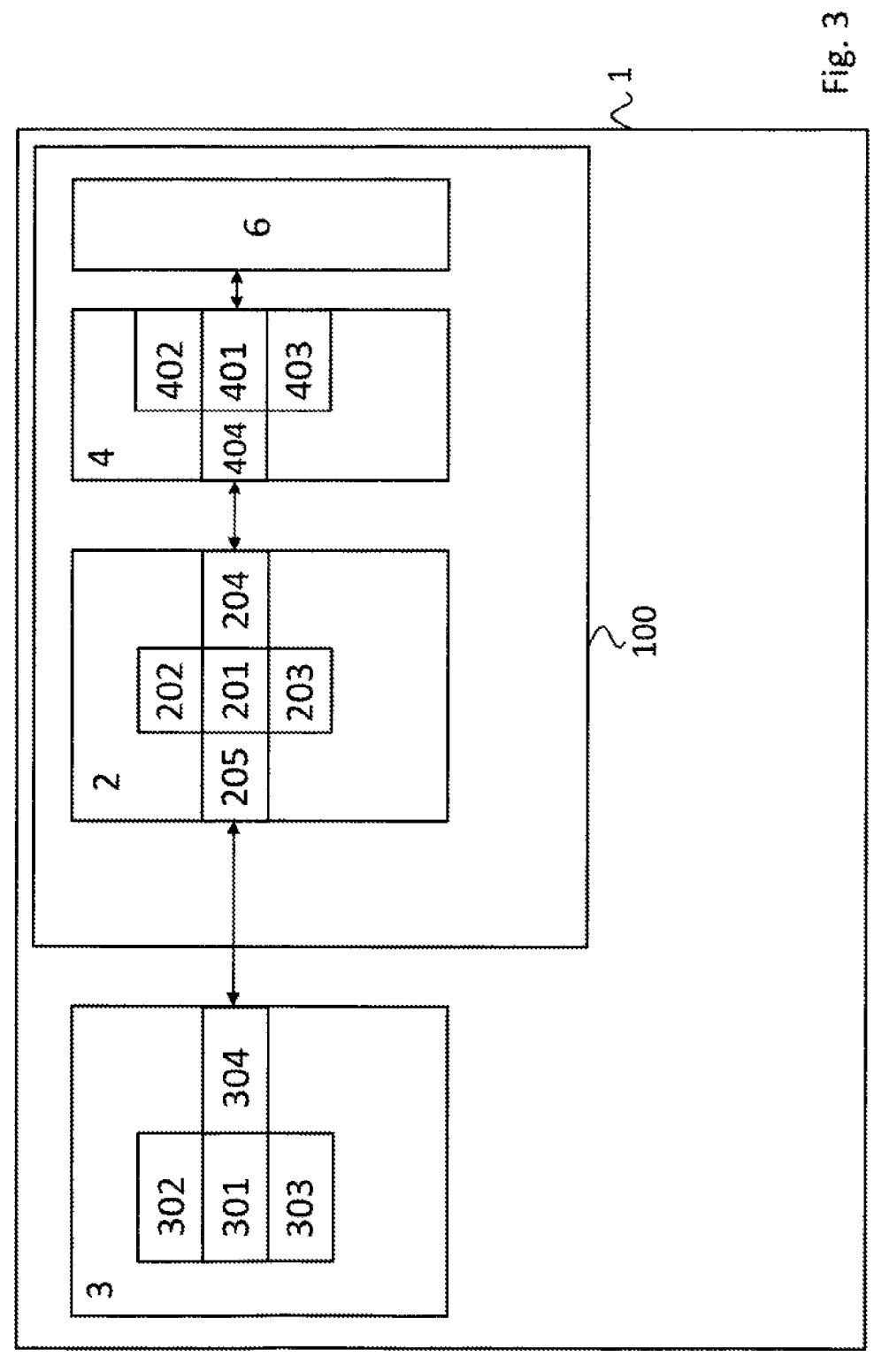
FIG. 3 shows a third embodiment of the device according to the invention.

FIG. 3 shows the device 1 comprising the security element 2 and the user verification element 100 with the verification controller 100, the sensor 6 and the sensor controller 4.

The verification controller 2 has a processor unit 201, a volatile memory 202 and a non-volatile memory 203. The verification controller 2 further has communication interfaces 204 and 205 for the connection to the sensor controller 4 and the security element 3.

The security element comprises a processor unit 301, a volatile memory 302 and a non-volatile memory 303, and also a communication interface 304 which is connected to the verification controller 2.

The sensor controller 4 has a processor unit 401, a volatile memory 402, a non-volatile memory 403 and a communication interface 404 which is connected to the verification controller 2.

The user verification element 100 is designed and configured to carry out a user verification by means of the sensor 6 and to transmit the obtained user verification status in encrypted form as authorization information to the broker element 11 on the security element 3. In particular, the user verification status is transmitted in encrypted form from the sensor controller 4 to the verification controller 2 and from there to the security element.

The security element 3 is designed and configured to decrypt the encrypted user verification status transmitted from the user verification element 100.

If an application 12 on the security element 3 is intended to be selected or a transaction is intended to be performed by means of the application 12, a check is carried out on the security element 3 to determine whether the application 12 is present in the AID list. If so, a check is carried out in the blacklist in order to determine whether the required command has to meet specific requirements. If, for example, a positive user verification status is required for the command, the security element 3 checks the information transmitted from the user verification element 100 in order to determine whether a positive user verification status is present, and performs or foregoes the selection of the application or the execution of the transaction.

Figure 4:
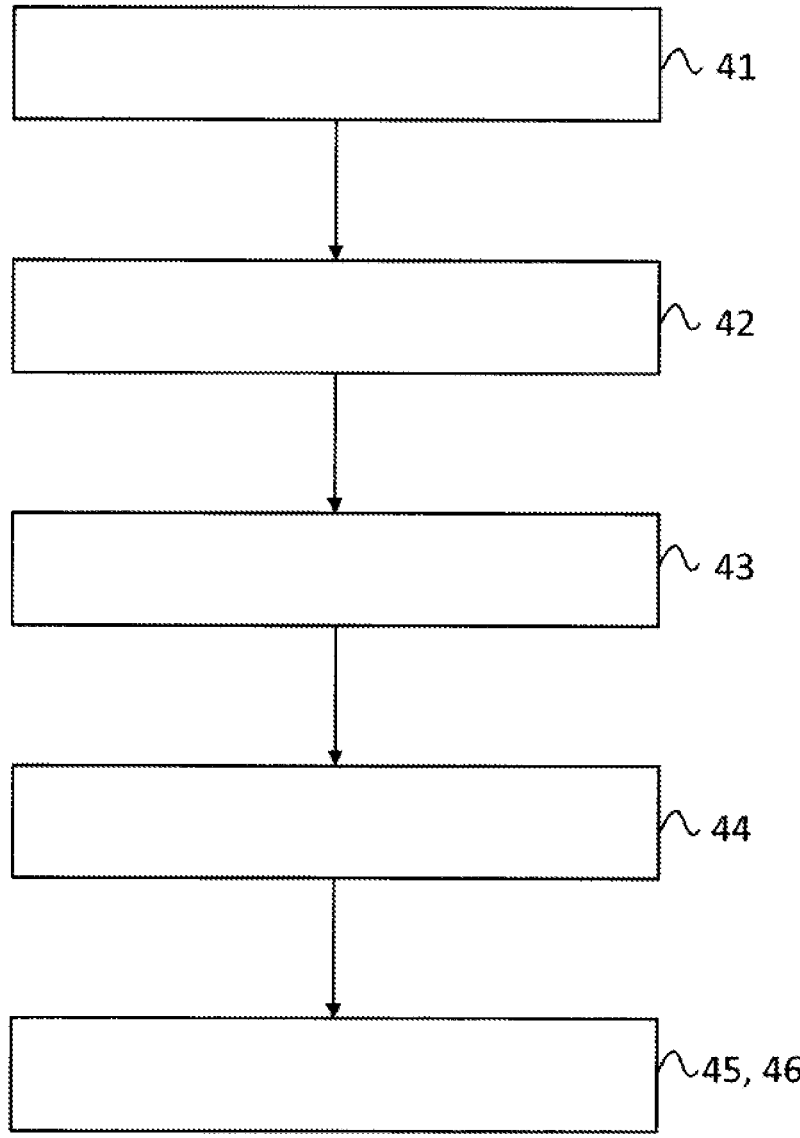
FIG. 4 shows the method according to the invention.

FIG. 4 finally illustrates the steps of the method according to the invention for authorizing an application 12 installed on a security element 3:

Step 41: checking whether the application 12 is contained in an AID list (optional);

Step 42: transmitting authorization information from the user verification element 100 to the security element 3;

Step 43: comparing the authorization information with requirements from a list on the security element 3;

Step 44: storing the authorization information on the security element 3 (optional); and Steps 45, 46: selecting the application 12 on the security element 3 and/or performing a transaction by means of the application 12, provided that the authorization information meets the requirements from the list.

The invention claimed is:

1. A method for authorizing an application installed on a security element, comprising the following steps:

transmitting authorization information from a user verification element to a broker application installed on the security element;

comparing, by the broker application, the authorization information with at least one requirement from an application identifier list on the security element, wherein when comparing a check is carried out in order to determine whether the authorization information concerns a security-related status, including a positive user verification status; and selecting the application on the security element by the broker element, provided that the authorization information meets the requirements from the list, wherein the application identifier list is stored in the broker application, and wherein the security element is a chip card, smart card, embedded secure element (eSE), and/or an embedded universal integrated circuitry (eUICC) card.

2. The method according to claim 1, comprising the step of providing a device which comprises the security element and the user verification element.

3. The method according to claim 1, comprising the step of transmitting authorization information from at least one further user verification element to the security element, wherein the at least one further user verification element is provided separately from a device which comprises the security element.

4. The method according to claim 1, wherein the list is provided as a blacklist or protection trigger list.

5. The method according to claim 1, wherein a check is carried out in connection with the step of comparing in order to determine whether the application is recorded in an application identifier list.

6. The method according to claim 1, wherein the broker application installed on the security element stores the authorization information and carries out the steps of comparing and selecting and/or performing.

7. The method according to claim 1, wherein the user verification status is generated by means of a biometric sensor.

8. The method according to claim 7, wherein the biometric sensor is provided as a component of the user verification element.

9. The method according to claim 7, wherein, following the selection of the application, the user verification status is reset so that a further selection requires a user verification.

10. The method according to claim 1, wherein the authorization information is transmitted in encrypted form.

11. The method according to claim 1, wherein the application is configured to perform a transaction in a contactless manner by means of the security element.

12. The method according to claim 1, wherein the application is configured to perform a transaction that is performed is an authentication transaction, a payment transaction and/or an access control transaction.

13. The method according to claim 1, wherein the broker application is configured to permit or prevent access to one or more JavaCard applets and/or Quick Visa Smart Debit/Credit (qVSDC) applications installed on the security element.

14. The method according to claim 1, wherein transmitting authorization information comprises transmitting authorization information from a verification controller to the broker application, wherein the verification controller is configured to receive a user verification status from the user verification element and to transmit the user verification status as the authorization information to the broker application.

15. The method according to claim 14, wherein the verification controller is connected to the broker application via a cryptographically secured link.

16. The method according to claim 1, wherein the broker application is pre-personalized by personalization data which comprises a cryptographic key set for securing the transmitting of the authorization information.

17. A device comprising a user verification element and a security element with an application installed thereon, the security element being a chip card, smart card, embedded secure element (eSE), and/or an embedded universal integrated circuitry (eUICC) card, wherein:

the user verification element is configured to transmit authorization information to a broker application installed on the security element, and in order to authorize the application, the broker application installed on the security element is configured to compare the authorization information received from the user verification element with at least one requirement from an application identifier list stored on the broker application, to carry out a check in order to determine whether the authorization information concerns a security-related status, including a positive user verification status, and to select the application, provided that the authorization information meets the requirements from the list.

18. The device according to claim 17, wherein the device is configured to carry out a method for authorizing an application installed on a security element, comprising the following steps:

transmitting authorization information from a user verification element to the security element;

comparing the authorization information with at least one requirement from a list on the security element; and selecting the application on the security element and/or performing a transaction by means of the application, provided that the authorization information meets the requirements from the list.

* * * * *